UNITED STATES PATENT OFFICE.

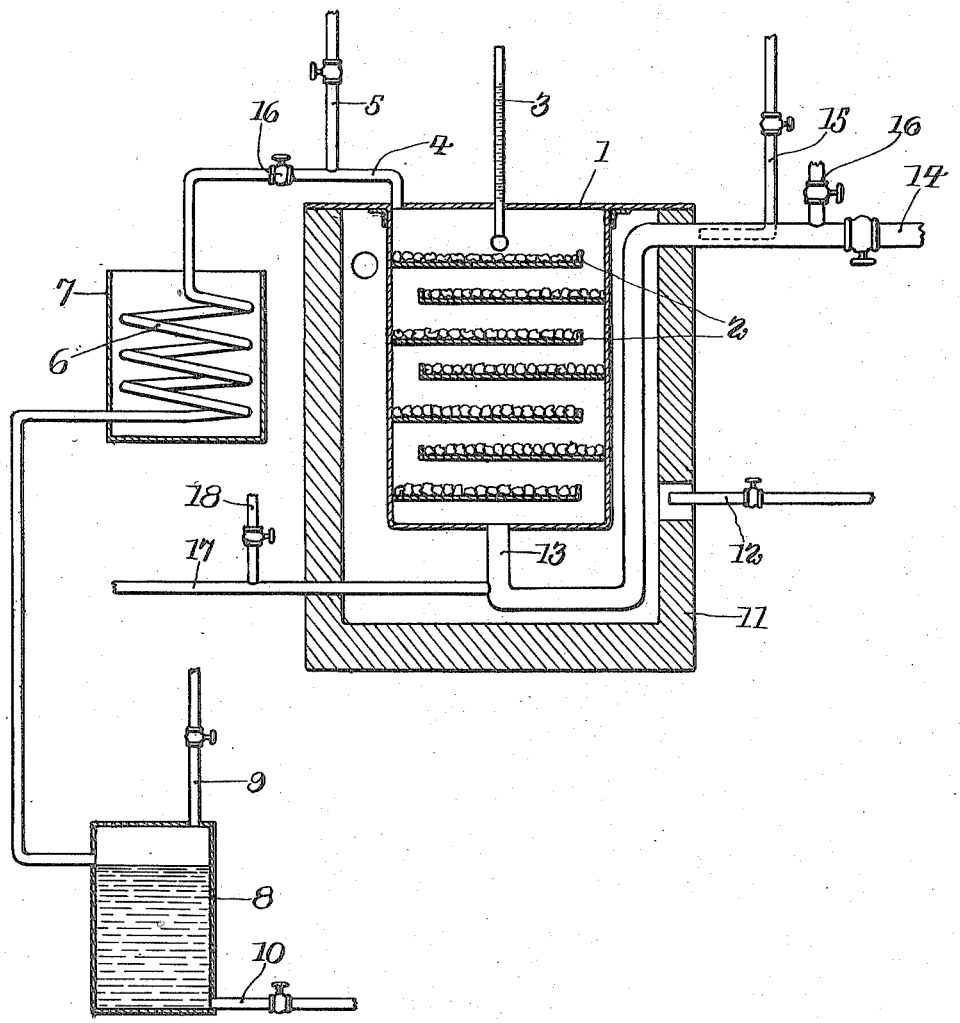

KARL P. McELROY, OF WASHINGTON, DISTRICT OF COLUMBIA, ASSIGNOR TO CHEMICAL DEVELOPMENT COMPANY, A CORPORATION OF MAINE.

PRODUCING CHLORHYDRINS FROM OLEFINS.

1,315,229.  Specification of Letters Patent.  Patented Sept. 9, 1919.

Application filed July 5, 1916. Serial No. 107,584.

*To all whom it may concern:*

Be it known that I, KARL P. McELROY, a citizen of the United States, residing at Washington, in the District of Columbia, have invented certain new and useful Improvements in Producing Chlorhydrins from Olefins, of which the following is a specification.

This invention relates to the production of solvents; and it comprises a method of converting gaseous and vaporizable olefins into useful solvent bodies containing oxygen and chlorin wherein such olefins or a mixture comprising the same such as oil gas, are brought into contact with a reducible chlorid in the presence of water, either as liquid or as vapor, to cause a reduction or partial reduction of such chlorid by, or with the aid of said olefins, or mixture of olefins, said reduction being generally conducted at a temperature such that the new bodies produced by the coaction of the chlorin of the chlorid with the olefins will be formed as vapors which are subsequently condensed and recovered; and it more particularly comprises a process or method of making such solvents wherein said chlorid is used as described and is regenerated simultaneously or non-simultaneously as the case may be, with the aid of air and hydrochloric acid; all as more fully hereinafter set forth and as claimed.

In my Patents Nos. 1,253,615 and 1,253,616 I have disclosed and claimed methods of making useful solvent bodies by reacting upon olefins with chlorin in the presence of water as liquid or vapor. These solvent bodies are of the nature of chlorhydrins, that is they contain both chlorin and oxygen, this oxygen being in the form of combination known as hydroxyl (.OH). Ethylene chlorhydrin, for example, is $CH_2Cl.CH_2OH$, being in substance a chlorinated ethyl alcohol ($CH_3CH_2OH$). In these patents I disclose the use of oil gas as a material rich in gaseous olefins and suitable as a source of these bodies for my purposes.

In said patents I disclose various ways of bringing about reaction between olefins and chlorin and water to produce said oxygenated and chlorinated bodies of the nature of chlorhydrins, Serial No. 34678 disclosing treatment of olefins with steam and chlorin. In Serial No. 65983 I disclose the simultaneous production and utilization of chlorin in the electrolytic cell. The chlorhydrins are chlorinated bodies more or less soluble in water but not indefinitely soluble therein. As stated, they are useful for solvent purposes. They are derived from the olefins by direct addition thereto of chlorin and oxygen and hydrogen, the oxygen and hydrogen being in the group form .OH. The olefins are unsaturated hydrocarbons, that is hydrocarbons not containing sufficient hydrogen to saturate the combining power of the carbon; and are consequently relatively reactive bodies. The lower olefins, ethylene, propylene and the butylenes are normally gaseous; the others are liquid or solid. Oil gas, and some other gases made by destructive distillation or organic materials, are rich in olefins; mainly propylene and ethylene but with more or less butylenes and amylenes. Gasolenes made by cracking distillation of petroleum are rich in volatile liquid olefins. I shall hereinafter speak more specifically of oil gas, it being understood that the hereindescribed methods are equally applicable to the pure olefins it contains or to the olefins of cracked gasolenes.

I have found that it is not necessary to preliminarily form chlorin as such to enable the production of said bodies but that they may be produced from reducible chlorids by taking advantage of the strong reducing powers of the olefins. And advantageously I select chlorids of such a type and perform the operation in such a manner that the chlorid may be regenerated by reoxidizing with the aid of air and reconverting the reoxidized material into the original chlorid with the aid of hydrochloric acid. This regeneration may be simultaneous with the solvent forming operation in which case the chlorid is, so to speak merely a catalyst or carrier, or solvent making and regeneration may be in successive stages.

In a broad way, again taking etylene as an example, the present solvent making operation by which $C_2H_4$ is converted into $C_2H_4OHCl$, may be regarded as the addition to the olefin of .OH and .Cl or as the addition of one atom of oxygen and one molecule of HCl. Oxygen and HCl, in the regenerative process, are supplied to the materials in the ratio indicated. I regard cupric chlorid, $CuCl_2$, as the best chlorid for my purposes. Cupric chlorid is readily reduced to CuCl with loss of one Cl; and as readily regenerated. When CuCl is exposed to oxygen (air) it readily reoxidizes, 2CuCl taking up an oxygen atom to form CuO and $CuCl_2$. The CuO is readily reconverted into $CuCl_2$ by hydrochloric acid.

Cupric chlorid is reduced by olefins, such as those of oil gas; and in the presence of water as vapor or liquid, the reaction goes forward to form the bodies I desire, the oxygenated and chlorinated derivatives of the olefins. At temperatures of 100° centigrade or lower, the action is however quite slow, this being in part due to slowness of reaction and in part to the insolubility of these olefins in aqueous liquids, and particularly hot liquids. The former cause of slowness may be remedied to some extent by the presence of catalysts such as palladium chlorid, charcoal, platinum black, antimony salts, etc., and the latter by vigorous agitation, filming out, and other mechanical ways of producing effective contact between a gas and a liquid. The use of high pressure is advantageous.

In using cupric chlorid for the sake of speed I therefore ordinarily work at a temperature over 100° C.; advantageously using a temperature rather considerably above as this enables a quicker action. A temperature around 160° C. works well.

In a typical embodiment of my invention using copper chlorid at an elevated temperature, I may use apparatus such as is shown in the accompanying illustration.

In this showing, the figure represents the apparatus in central vertical section.

Element 1 represents a reaction chamber provided internally with shelves 2 extending from side to side and so arranged as to cause circuitous travel of the gases. On these shelves is copper chlorid, either as the dry brown salt; or, and better, taken up by a carrier to give a more extended surface. Asbestos, pumice stone, or bits of baked clay, may, for example, be impregnated with the dissolved salt and then dried. At its top the chamber is provided with thermometer 3 and vapor outlet 4. This vapor outlet has a valved waste connection 5 and is continued as condensing worm 6 in cooling tub 7. The worm discharges into collecting tank 8 having gas discharge 9 and liquid outlet 10. Surrounding the reaction chamber is housing 11 forming a heating chamber. Heating may be by steam or by any other convenient means. Gas burner 12 is shown. Entering the reaction chamber at its base is conduit 13, having a connection 14 by which gas may be introduced. Steam jet 15 furnishes water vapor for admixture with the gas and acts also as a propelling means. Also connected to this conduit is a valved conduit 16 serving to introduce air. HCl may be introduced at 17 by steam from 18.

In the stagewise use of the above device, after the reaction chamber is at the proper temperature gas and steam are introduced at 14 and 15 and the mixture, preheated in 13, is sent into the reaction chamber. Here the gas and steam react with the copper chlorid to produce vapors of the desired products which go forward with non-reacting gases (if any such be present) and excess of steam to condensing worm 6. Here water and vapors are condensed together and collected in tank 8. If the amount of steam is relatively small, the condensate in the case of treating oil gas, may separate into two layers, the lower or heavier being the desired solvents containing some dissolved water and the upper being a saturated aqueous solution of the same. With more steam the condensate may be a more or less dilute solution and in a single layer. It is desirable to work with plently of steam in making chlorhydrins and recover the liquid condensate as an aqueous solution of such chlorhydrins.

The watery liquid in 8 may be redistilled in any suitable fractionating device to recover the chlorhydrins. With good fractionation the chlorhydrins will come over first as a more or less wet oily liquid separating from a saturated solution of the same bodies. This saturated solution may be returned to the still. The wet oily liquid thus obtained may be dried with salt and redistilled. While the liquid contains a number of different bodies, their boiling points are so close to each other that for commercial purposes the liquid may be said to be unitary. It dissolves gum kauri and very many other resins, cellulose acetate and a number of other coating materials.

After the apparatus shown has functioned for a period of time the cupric chlorid will be reduced to cuprous chlorid and it is necessary to regenerate cupric chlorid. For this purpose, the supply of steam and gas is shut off and air and steam are introduced at 15 and 16. The cuprous chlorid is rapidly converted into a mixture of cupric chlorid and cupric oxychlorid $3CuO, CuCl_2$. A little hydrochloric acid is now blown in at 17 which converts the oxychlorid into cupric chlorid and the apparatus is ready for reuse in the formation of chlorhydrins. Air, steam and hydrochloric acid may be blown in simultaneously. The apparatus shown is susceptible of continuous use, air, steam, gas and hydrochloric acid being all blown in simultaneously. But this I do not recommend since it causes a dilution of the waste gases coming from 9 with the nitrogen of the air; at once causing condensation to be more difficult and less complete and injuring the value of the waste gases for fuel and other purposes.

In lieu of using cupric chlorid in the apparatus just described, I may use ferric chlorid, $FeCl_3$. Ferric chlorid functions in the same way, becoming converted into ferrous chlorid which is afterward regenerated in the same manner as the cuprous chlorid. A mixture of cupric and ferric chlorids may also be used and in some respects has its advantages over either chlorid.

In lieu of using cupric chlorid or ferric chlorid, which however I regard as best adapted for the present purposes in the operation just described, I may use almost any metallic oxid which is capable of uniting with hydrochloric acid to form a chlorid and of being reoxidized by air and steam. But with most of these oxids it is necessary to use air, HCl, gas and steam simultaneously with the noted disadvantages. I may for example charge with magnesia, zinc oxid, etc., and blow through it at a temperature of 150° C. to 200° C. a mixture of steam, gas and air. Under these conditions the same action goes forward. The oxid in this case may be regarded as a simple catalytic as may the cupric or ferric chlorids where the simultaneous formation of chlorhydrins and regeneration of the material is performed.

With cupric and ferric chlorid, by cutting off the supply of steam in the solvent making step but otherwise operating as previously described, in lieu of producing chlorhydrins I produce the chlorids of the olefins; ethylene chlorid, (Dutch liquid) propylene chlorid, etc. After making these chlorids, the ferric or cupric chlorid may be reproduced by first reoxidizing with steam and air and then supplying hydrochloric acid. Simultaneous admission of hydrochloric acid with the air and steam in this case is not to be recommended.

While I have described this operation more particularly hereinbefore as applied to the treatment of chlorids in a dry state, yet it is not restricted thereto and I may use the chlorids mentioned and a great variety of other chlorids in a wet state; that is operate on solutions or wet masses of reacting bodies. I find it advantageous however generally to operate at a temperature of at least 100° C. in order that the chlorhydrins may be removed from the zone of reaction in the vapor form as far as formed. While the boiling point of the chlorhydrins formed from oil gas is rather high, ranging between 125° and 137° C., yet they are all readily volatile with water vapor and can all be removed with water vapor from the zone of reaction at a temperature between 97° and 100° C.

The rate of reaction of the olefins with reducible chlorids at temperatures below 100° C., is also rather slow. Palladium chlorid is the only chlorid which reduces with any rate of speed at ordinary temperatures. A solution of palladium chlorid containing free HCl will give the desired chlorhydrins in the cold; but as these bodies must subsequently be distilled off, it is better to work hot and combine the formation with distillation. In the operation palladium is reduced to the metallic form and the palladium chlorid may afterward be regenerated by reoxidizing with air in the presence of HCl. Both air and gas may be simultaneously blown through the hot solution. Palladium chlorid however being relatively expensive it is better to use it in connection with something which may serve, so to speak, as a storehouse of oxygen or chlorin. For this purpose cupric chlorid is convenient. In the presence of cupric chlorid, palladium is not reduced to metallic form, cuprous chlorid being produced. Unless the solution be quite acid with HCl, however, other bodies than chlorhydrin are produced. Instead of copper chlorid, any autoxidizable oxid or chlorid may be employed, such, for instance, as $V_2O_5$, $MoO_3$, $TeO_2$, $SbCl_3$, etc. Various readily autoxidizable salts and substances may be used in connection with the palladium chlorid. Vanadate of cerium, vanadate of manganese and vanadate of copper are particularly good adjuncts to the palladium chlorid; acting, so to speak, as storing means for oxidizing power and enabling the amount of palladium to be cut down to merely that necessary as a catalyst. The use of palladium chlorid with a boiling acid solution of $CuCl_2$ is particularly convenient. Instead of palladium chlorid, chlorids of the other noble platinum metals may be employed but are not as desirable as palladium chlorid. Osmium, rhodium, platinum and ruthenium compounds in solution in HCl may be used.

$SbCl_5$ in the presence of water, which is practically a solution of antimonic acid in HCl, is a readily reactive body, in producing chlorhydrins, but is somewhat difficult to regenerate. A mixture of $SbCl_5$ and $CuCl_2$ regenerates much more readily and is better than either reagent singly. Tin tetrachlorid in the presence of water with enough HCl to keep the solution clear may also be used. Thallium chlorid may be used.

The HCl employed in the present process may come from any convenient source, as by treating salt with sulfuric acid, etc. In another application, Serial No. 34678 I have disclosed a process of making the present bodies by the reaction of steam and chlorin with oil gas. In this reaction half, or approximately half, of the chlorin is converted into HCl. This HCl may be employed in the present process.

Olefins from any source may be employed in the present invention. Ethylene, for example, may be made by hydrogenating acetylene. But I ordinarily employ oil gas made by cracking oil at a temperature around 700° C. Such oil gas may be made with 40 to 60 per cent. of contained olefins, these olefins being mainly ethylene and propylene with smaller amounts of the butylenes and amylenes. The butylenes and amylenes may be removed by compressing and chilling or by scrubbing with oil. All these olefins, however, give chlorhydrins of about the same boiling point, so that for commercial purposes the mixture of chlorhydrins obtained in treating oil gas may be considered as a unitary body.

What I claim is:—

1. The process of making chlorin-containing derivatives of the olefins which comprises reacting upon a reducible chlorid with such olefins, and recovering such derivatives.

2. The process of making chlorin-containing derivatives of the olefins which comprises reacting upon a heated reducible chlorid with such olefins and condensing and recovering the vapors of such derivatives.

3. The process of making olefin derivatives containing oxygen and chlorin which comprises reacting upon a reducible chlorid with such olefins in the presence of water.

4. The process of making olefin derivatives containing oxygen and chlorin which comprises reacting upon a reducible chlorid with such olefins in the presence of water at such a temperature as to produce such derivatives in a vapor form and condensing and recovering the vapors.

5. The process of making olefin derivatives containing oxygen and chlorin which comprises reacting upon a reducible chlorid with a mixture of water vapor and olefin and regenerating said chlorid with HCl and oxygen.

6. The process of making olefin derivatives containing oxygen and chlorin which comprises alternately reacting upon a reducible chlorid with a mixture of water vapors and olefin and regenerating said chlorid with oxygen and HCl.

7. The process of making solvents which comprises reacting upon hot cupric chlorid with an olefin and condensing and recovering the vapors formed.

8. The process of making solvents which comprises reacting upon hot cupric chlorid with an olefin in the presence of water vapor and condensing and recovering the vapors formed.

9. The process of making solvents which comprises reacting upon hot cupric chlorid with an olefin and water vapor to form cuprous chlorid and olefin derivatives containing chlorin and regenerating cupric chlorid from such cuprous chlorid with oxygen and HCl.

10. The process of making solvents which comprises alternately exposing hot cupric chlorid to the action of an olefin to reduce the same to cuprous chlorid and exposing the cuprous chlorid so formed to the action of oxygen and HCl.

11. The process of making solvents which comprises alternately exposing a composition containing copper and chlorin in the form of a copper chlorid to the action of an olefin in admixture with water vapor and to the action of oxygen and HCl.

In testimony whereof, I affix my signature hereto.

K. P. McELROY.